March 21, 1944.    A. C. WOOD    2,344,663
SUB-SURFACE CROP HARVESTER
Filed Oct. 12, 1942    3 Sheets-Sheet 1
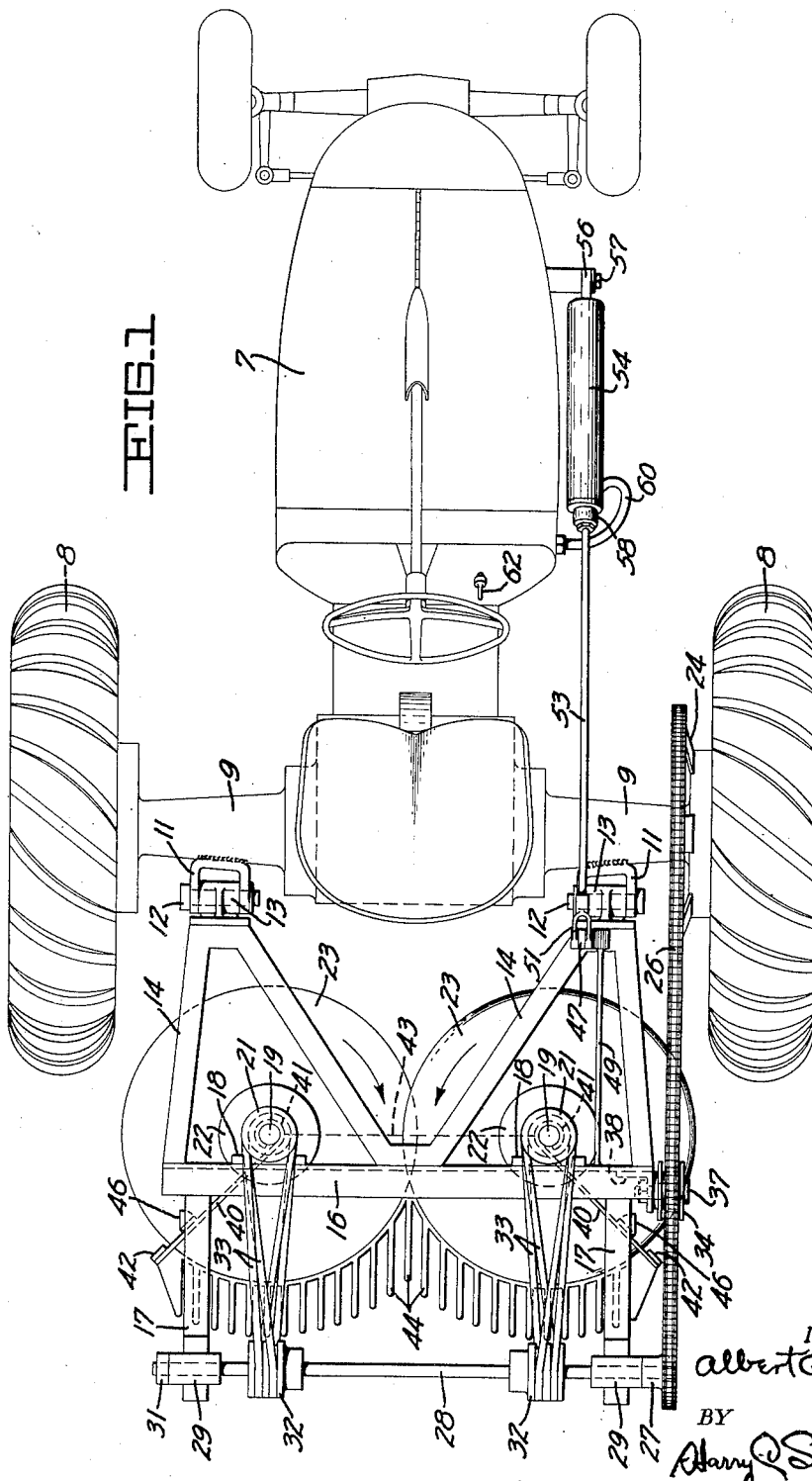
INVENTOR.
Albert C. Wood
BY
Harry Schroeder
ATTORNEY March 21, 1944.  A. C. WOOD  2,344,663
SUB-SURFACE CROP HARVESTER
Filed Oct. 12, 1942  3 Sheets-Sheet 2
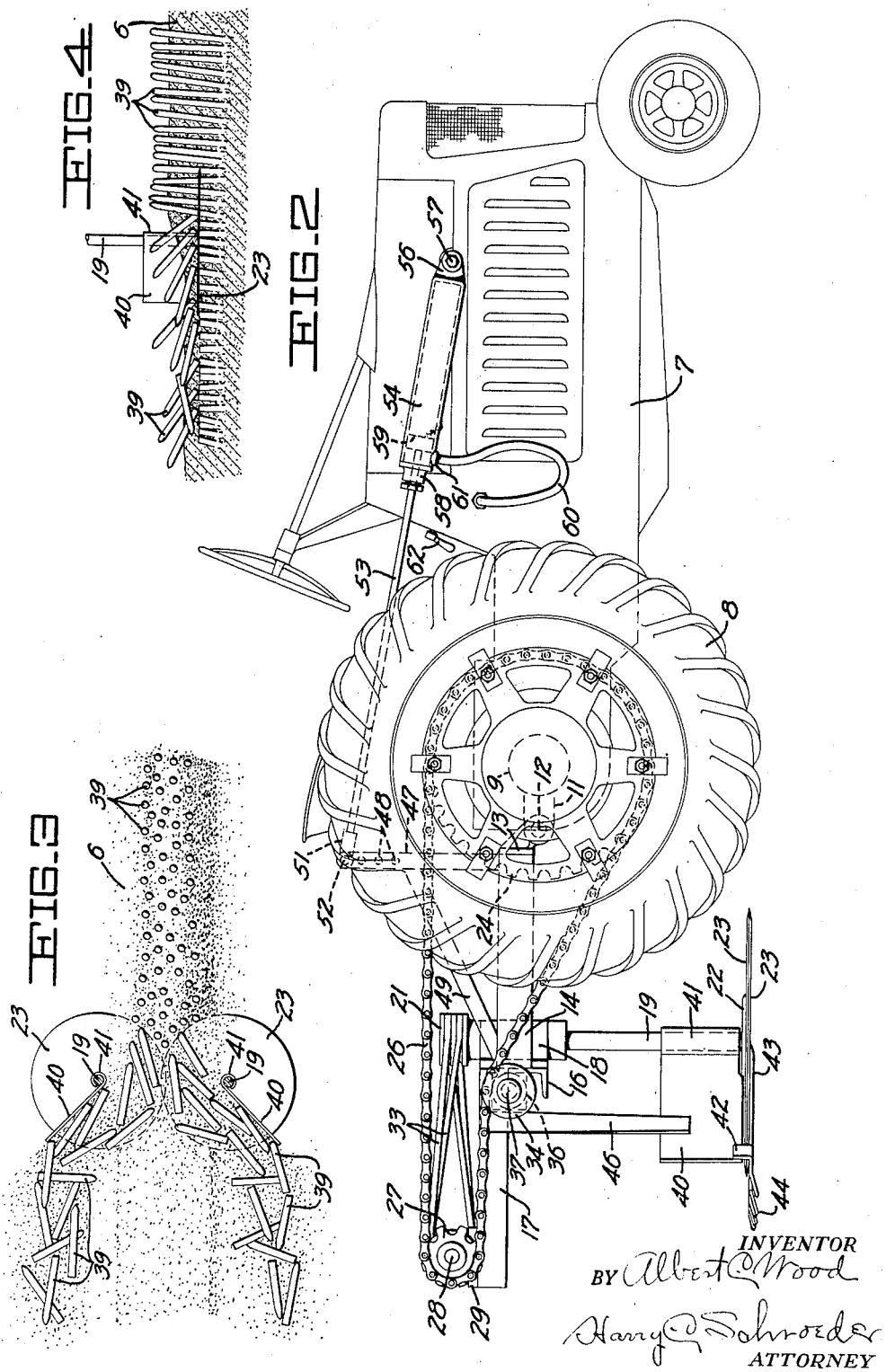
INVENTOR
BY Albert C. Wood
Harry C. Schroeder
ATTORNEY

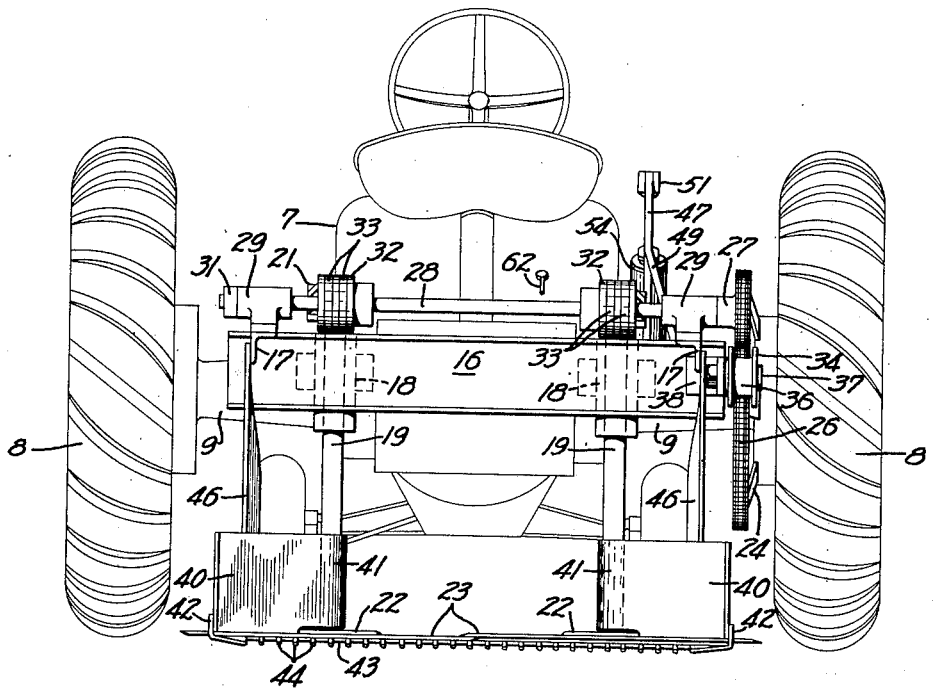

Patented Mar. 21, 1944

2,344,663

UNITED STATES PATENT OFFICE 2,344,663

SUBSURFACE CROP HARVESTER

Albert C. Wood, Rio Vista, Calif.

Application October 12, 1942, Serial No. 461,711

10 Claims. (Cl. 55—62)

This invention relates to machines for harvesting subsurface crops from the soil.

It is an object of the invention to provide a machine which will successfully harvest crops in the nature of asparagus, which heretofore had to be harvested by hand.

Another object of the invention is to provide a harvesting machine which will cut growths, such as asparagus, from their roots below the surface of the soil, without the necessity of trenching or otherwise greatly disturbing the soil.

A further object of the invention is to provide a machine which, after cutting the sprouts, or growths, from the roots below the surface of the ground, will handle the cuttings in such a way that the latter are left exposed above the soil so that they may be subsequently collected.

Still another object of the invention is to provide a harvester which may be attached to, and will operate satisfactorily with, a tractor, an automobile or an ordinary horse-drawn vehicle.

This invention possesses other objects and features of advantage which will become apparent to those skilled in the art upon examination of the accompanying detailed description. It is to be understood that the invention is not to be limited to the specific form thereof herein shown and described, as various other embodiments thereof may be employed within the scope of the appended claims.

Referring to the drawings:

Figure 1 is a top plan view of the harvester of my invention showing the latter mounted for operation on a farm tractor.

Figure 2 is a side elevational view of the structure shown in Figure 1.

Figure 3 is a top plan view, schematic in character, showing the action of the cutter blades in harvesting a row of growths such as asparagus.

Figure 4 is a side elevational view, of the showing of Figure 3, illustrating the cutting operation.

Figure 5 is a rear end elevational view of the harvester.

As illustrated in Figures 3 and 4, asparagus is grown in drills 6 and banked up during growth so as to blanch the shoots. Thus, when ready for harvesting, only the tips of the shoots appear above the tops of the earth ridges. It is impracticable, due to the close grouping of the shoots, to remove the soil so as to expose the shoots down to the point where they are to be cut off with the result that the harvesting must be done by cheap laborers who, by hand, insert a knife into the soil and sever each shoot individually, care being exercised that the shoots are not cut shorter than a minimum prescribed length which is acceptable to marketers and canners. The time and crew required to harvest a field of asparagus are therefore considerable and are consequently reflected in the price at which the crop must be sold to show even a moderate profit. It has become increasingly difficult to obtain experienced labor who will work for low farm wages, and as a result, the average asparagus farmer has watched his profits gradually decreasing, and not infrequently he is operating at a loss. Since cutting of the crop is the most costly and time consuming item of the harvest duties, I set about evolving a machine which would be capable, at least, of maintaining a production schedule comparable to that of first-class hand cutters, and succeeded in producing an apparatus which vastly exceeds such schedule. Furthermore, the apparatus may be operated continuously at comparatively high speed and without stoppages for service or adjustments.

In detail, I have shown a carrier 7, which may be any powered vehicle such as an automobile, or a tractor, provided with ground-engaging wheels 8, carried by and supported on the vehicle by a suitable axle structure 9. The wheels 8 should be spaced far enough apart so as to straddle each of the drills 6. Secured to a convenient portion of the carrier 7, such as by welding to the axle structure 9, is at least a pair of relatively spaced brackets 11, carrying pivot pins 12, on which are journaled eye brackets 13, attached to a horizontally and rearwardly extending W-shaped tilt frame 14 having a header bar 16 attached thereto. Parallel arms 17, forming integral portions of the support frame, are secured to and extend horizontally rearwardly from the header bar 16. Mounted on the header bar 16, in spaced relation transversely of the carrier 7, is a pair of bearings 18, each being provided with an axially vertical bore in which is journaled a cutter drive shaft 19 fitted, at its upper end, with a peripherally grooved pulley 21, and, at its lower end, with a flanged hub 22 to which is secured a circular cutter disk 23 having, as shown in Figure 2, a sharpened peripheral edge. The shafts 19 are so positioned that the peripheries of the cutter disks 23 overlap slightly, and the cutter disks are positioned substantially in a horizontal plane tangent to the point of engagement of the wheels with the ground. This position is subject to adjustment, as will be explained later.

Means is provided for rotating the cutter disks 23. Concentric with and secured to one of the drive wheels 8, or to its rotating structure, is a sprocket 24 meshing with a chain 26 which extends rearwardly and meshes with the teeth of a sprocket 27 secured to one end of a jackshaft 28 extending transversely of the carrier 7 and journaled in suitable bearings 29, mounted on the arms 17. Axial movement of the jackshaft 28 is limited at one end by the hub of the sprocket 27 and at the other end by a collar 31 either pressed or pinned on the jackshaft and engaging the outer end of one of the bearings 29. Mounted on, and for rotation with, the jackshaft 28 is a pair of peripherally grooved pulleys 32 connected, by half-twisted belts 33 with the pulleys 21 of the cutter drive shafts 19. An idler pulley 34, having a peripheral groove 36 therein, in which a portion of the chain 26 is engaged, is journaled on a pin 37 carried by a bracket 38 secured to an end of the header bar 16 and is for the purpose of taking up any slack in the chain 26 which might cause the latter to slip on the sprockets 24 or 27. It will be seen that when the drive wheels 8 are rotated to move the carrier 7 in a forward direction, the sprocket 24 will also be rotated, at the same rotational speed as the drive wheels, thereby imparting rotation, through the connecting chain 26, to the jackshaft 28 which, in turn, imparts rotation to the shafts 19 and the cutter disks 23 through the belts 33. It will be noted that the belts 33 are twisted to pass oppositely around the pulleys 21, thus causing the cutter disks 23 to be rotated in opposite directions as indicated by the arrows in Figure 1.

As is indicated in Figures 3 and 4, when the machine is alined with and straddling a drill 6, and caused to move therealong, the cutter disks 23 will slice into the drill at a predetermined distance below the tops of the asparagus shoots 39, and, as the carrier 7 moves along the drill will sever the shoots; the latter being cut by the sharp bevelled edges of the cutter disks. The forward motion of the disks through the soil will crowd the cut asparagus shoots, together with the surrounding soil, onto the upper surfaces of the cutter disks.

Means is provided for effectively separating the soil from the cut shoots so that the shoots may not become covered by the loosened soil and thereby become concealed from the gathering crew which follows the harvester, and means is further provided for casting the cuttings into a pair of separated rows along the sides of the drill 6 so that the cuttings are more concentrated, thereby greatly facilitating the gathering thereof. Positioned above each of the cutter disks 23 and diverging, relatively, rearwardly of the harvester, is a pair of vertical deflector plates 40 each having an end thereof formed with a loop 41 encircling a driveshaft 19, so that the latter is free to rotate in the loop, and each having its other end connected to clips 42 rising from the respective ends of a plate 43 extending transversely of the harvester and positioned immediately below the cutter disks 23. The rearward edge of the plate 43 is extended beyond the adjacent peripheries of the cutter disks 23 and is notched to form relatively long parallel tines 44 projecting from the rearward edges of the cutter disks. Stabilizing brackets 46 connect the deflector or plates 40 with an adjacent portion of the frame, such as the arms 17, so as to rigidly maintain the position of the plate 43 and the deflector plates 40 relative to the cutter disks 23. It will be seen by referring to Figure 3, that as the cutter disks 23 are advanced along the drill 6, the cuttings 39 together with the soil forming the crown of the drill will be forced across the upper surface of the cutter disks, and that, due to the counter rotational movements of the cutter disks the cuttings and the loosened soil will normally tend to separate into a pair of spaced deposits ranging along the opposite sides of the drill; the relative spacing between these deposits being governed by the angular positioning of the deflector plates 40. Normally, since the volume of soil greatly exceeds that of the cuttings 39 the soil would tend to pile up over the cuttings, thereby obscuring them from the view of the gathering crew which follows along in the wake of the harvester. However, since the soil is granular and due to the agitation thereof in passing across the cutter disks, the soil will tend to pack below the cuttings and will encounter the tines 44 which will resist movement of a great portion of the soil outwardly from the centerline of the drill and will thereby permit only the cuttings 39, which are now concentrated near the top of the soil mass, together with only a relatively small amount of soil to be deposited along the sides of the drill. It thus will be seen that, due to the small amount of soil finally deposited with the cuttings, the chances of the cuttings becoming covered and obscured are minimized.

Means is provided for raising the cutter disks from their operative position shown in the drawings to an elevated position whereby the harvester may be moved from place to place, between actual harvesting operations. Secured to, and rising from the tilt frame 14, and positioned closely adjacent a pivot thereof, is a lever 47 having in its upper or distal end a group of vertically spaced apertures 48 and provided with a stabilizing brace bar 49 joined, at its respective ends, with the lever 47 and with a remote portion of the tilt frame 14. A clevis 51, provided with a removable pin 52, which may be selectively inserted in one of the group of apertures 48, is connected to a forwardly extending control rod 53 which enters a cylinder 54, mounted on a convenient portion of the carrier 7, by means of a pivot bracket 56 and pin 57, through a stuffing box 58 and is connected with a piston 59, which operates within the cylinder 54 in the well-known manner. A preferably flexible conduit 60, connected at one end to an inlet port formed in a boss 61, positioned adjacent the gland end of the cylinder 54, is connected at its other end into the pressure oiling system of the carrier motor, and a selector valve 62, preferably mounted within easy reach of the operator, is provided so that oil may be admitted from the lubrication system into the conduit 60 and hence into the cylinder 54, or so that oil contained in the cylinder 54 may be allowed to drain back into the suction side of the lubrication system or into the sump thereof. It will be seen that when oil is admitted to the cylinder 54, the piston 59 will be pushed forward toward the pivoted end of the cylinder, thus pulling on the control rod 53, which will rock the lever 47 and cause the tilt frame 14 to move upwardly about its pivots, thereby raising the cutter disks 23 above the surface of the soil. The tilt frame and cutter disks may be maintained in their elevated positions as long as oil, under pressure, remains in the cylinder 54. Thus the operator may rapidly raise or lower the cutter disks whenever he desires, so as to interrupt cutting of the asparagus or to clear any obstruction which might damage the cutter disks.

The length of the stroke of the piston 59, in the cylinder 54, governs the upper and lower limits of travel of the cutter disks relative to the surface of the ground, but it will be seen that by moving the clevis 51, so that the pivot pin 52 thereof is engaged with different apertures 48 of the group thereof carried by the lever 47, the cutter disks may be adjustably positioned relative to the ground in one of several lowered positions from that in which they are shown depending upon which aperture 48, the pin 52 is engaged with, thus enabling the cutter disks to operate at a greater depth in the soil of the drill 6 and consequently producing an increase in the length of the cuttings 39. This vertical adjustment of the cutter disks is vitally necessary when drills containing stunted growths are encountered, so as to insure that the greater portion of the cuttings will not be below the minimum length acceptable by the marketers or canners.

It will be seen from the above description of my invention that I have produced a harvester, particularly adapted to cutting crops in the nature of asparagus, which may be operated at a speed greatly exceeding that at which a group of hand cutters could move along a drill; which produces cuttings of substantially uniform length; which requires the attendance of only a single operator; which cuts crops without the necessity of clearing any soil away from the plants prior to cutting; and which desirably exposes and concentrates the cuttings so as to facilitate ready collection theerof after the harvesting machine has passed.

Having thus described my invention in detail, what I claim as new, and desire to secure by Letters Patent, is:

1. Means for harvesting plant growths, in the nature of asparagus, which consist of vertical shoots growing substantially vertically through a ridged drill and substantially totally covered by the soil forming said ridged drill, comprising a disk cutter adapted to penetrate and to be moved along said ridged drill, said disk cutter having a continuous sharpened peripheral edge for engaging said shoots intermediate the tips and roots thereof, means for rotating said disk cutter to effect cutting of said shoots by the sharpened peripheral edge of the disk cutter, means for conveying said cut shoots from the ridged drill and for depositing said cut shoots along a side of said ridged drill, and means for arresting movement of a substantial amount of the soil of said ridged drill together with said cut shoots toward the point of deposition of said cut shoots.

2. Means for harvesting plant growths, in the nature of asparagus, which consist of vertical shoots growing substantially vertically through a ridged drill and substantially totally covered by the soil forming said ridged drill, comprising a carrier adapted to be moved along the ground adjacent said ridged drill, a rotatable disk cutter mounted on said carrier and positioned by the latter for entry into said ridged drill, said disk cutter having a sharpened peripheral edge engageable, when said carrier is moved, with said shoots intermediate the tips and roots thereof, means responsive to movement of said carrier along the ground for rotating said cutter disk so as to sever the shoots, means for guiding said cut shoots toward a point of deposition along a side of said ridged drill, and means for arresting movement of a material portion of the soil adjacent said cut shoots toward said point of deposition thereof.

3. A sub-surface crop harvester of the character described having in combination a supporting frame, a vertically disposed cutter shaft rotatively mounted in said frame, a cutter disk secured to the lower end of said shaft in a position to engage vertically growing shoots below the surface of the soil in which they are growing, means for imparting rotative movement to said cutter shaft, and means for separating the cuttings from adhering soil as they are cut.

4. A sub-surface crop harvester of the character described having in combination a supporting frame, a vertically disposed cutter shaft rotatively mounted in said frame, a cutter disk secured to the lower end of said shaft in a position to engage vertically growing shoots below the surface of the soil in which they are growing, means for imparting rotative movement to said cutter shaft, and a soil-separation plate supported adjacent to and below the plane of the disk and having means for separating the cuttings from the adhering soil as they are cut.

5. A sub-surface crop harvester of the character described having in combination a supporting frame, a vertically disposed cutter shaft rotatively mounted in said frame, a cutter disk secured to the lower end of said shaft in a position to engage vertically growing shoots below the surface of the soil in which they are growing, means for imparting rotative movement to said cutter shaft, a laterally inclined deflector plate supported adjacent to and above the plane of the disk, and a soil-separation plate attached to said reflector plate.

6. A sub-surface crop harvester of the character described having in combination a supporting frame, a plurality of vertically disposed cutter shafts rotatively mounted in said frame, cutter disks secured to the respective cutter shafts and arranged in overlapped relation, said disks being located in a position to engage vertically growing shoots below the surface of the soil in which the latter are growing, means for imparting opposite rotative movement to said cutter shafts, and a soil-separation plate located adjacent to and below the planes of said disks and having means for separating the cuttings from adhering soil as the former are cut.

7. A sub-surface crop harvester of the character described having in combination a supporting frame, a plurality of vertically disposed cutter shafts rotatively mounted in said frame, cutter disks secured to the respective cutter shafts and arranged in overlapped relation, said disks being located in a position to engage vertically growing shoots below the surface of the soil in which the latter are growing, means for imparting opposite rotative movements to said cutter shafts, laterally inclined deflector plates supported adjacent to and above the planes of said disks, and a soil-separation plate attached to the deflector plates and supported adjacent to and below the planes of said disks.

8. A sub-surface crop harvester of the character described having in combination a supporting frame, a plurality of vertically disposed cutter shafts rotatively mounted in said frame, cutter disks secured to the respective cutter shafts and arranged in overlapped relation, said disks being located in a position to engage vertically growing shoots below the surface of the soil in which the latter are growing, means for imparting opposite rotative movements to said cutter shafts, a pair of laterally inclined deflector plates each having a portion anchored to a cutter shaft, means for supporting the other ends of the deflector plates, and a soil-separation plate supported by the deflector plates in a plane adjacent to and below the planes of said disks.

9. A sub-surface crop harvester of the character described having in combination a supporting frame, a plurality of vertically disposed cutter shafts rotatively mounted in said frame, cutter disks secured to the respective cutter shafts and arranged in overlapped relation, said disks being located in a position to engage vertically growing shoots below the surface of the soil in which the latter are growing, means for imparting opposite rotative movements to said cutter shafts, deflector plates supported by said frame, and a soil-separation plate supported by the deflector plates, said soil-separation plate being provided with rearwardly extended soil-separating fingers.

10. A sub-surface crop harvester of the character described having in combination a supporting frame provided with forwardly projecting portions adapted to be connected with a source of propulsion, said frame having rearwardly extended arms, a pair of vertically disposed cutter shafts rotatively mounted in said frame, cutter disks mounted on the lower ends of said cutter shafts and in overlapped relation, said disks being located in positions to engage vertically growing shoots below the surface of the soil in which the former are growing, a jack shaft rotatively mounted in the rearwardly extended arms, means operated by said jack shaft for imparting opposite rotative movements to said cutter shafts, and means for separating the cuttings from adhering soil during the harvesting operations.

ALBERT C. WOOD.